INVENTORS
P. Bass
BY P. J. Waller

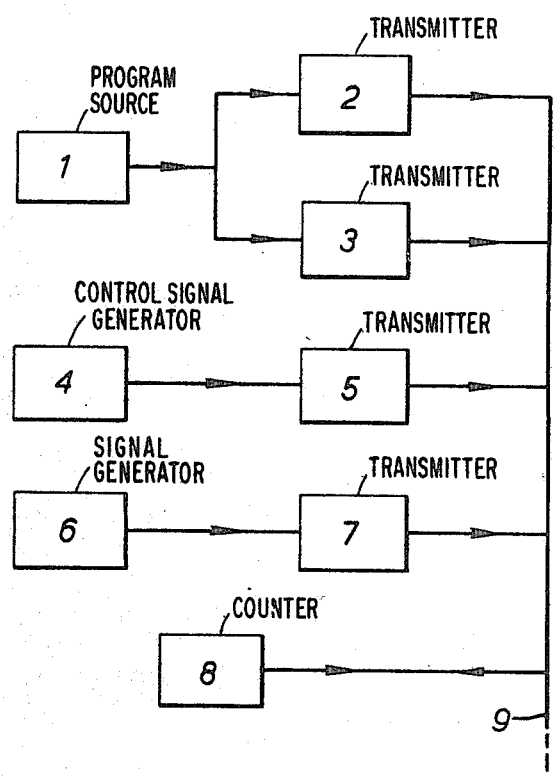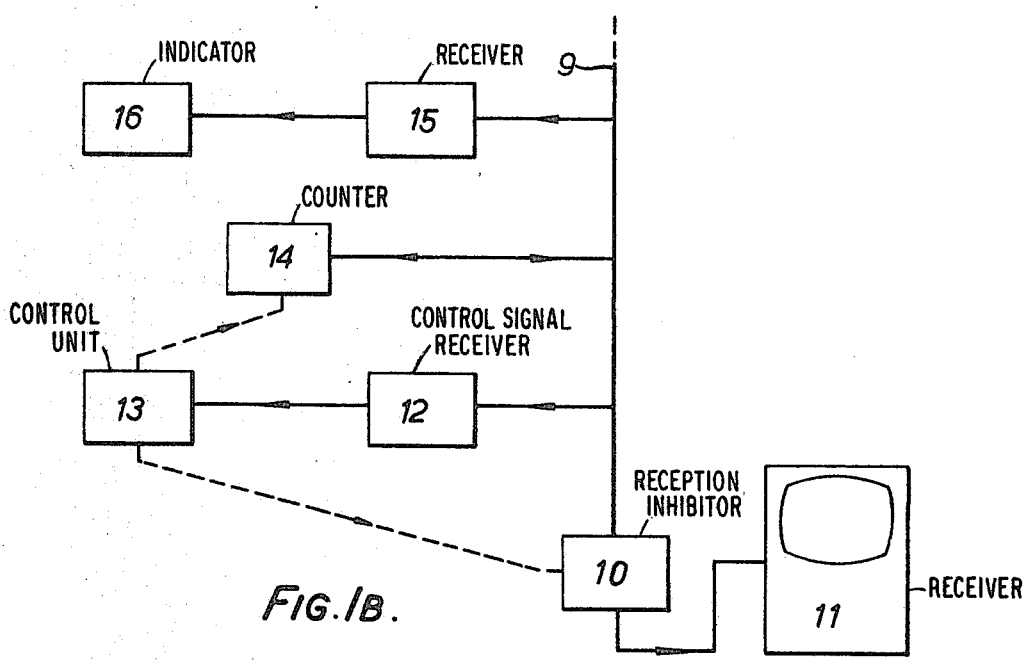

ATTORNEYS

INVENTORS
P. Bass
P. J. Waller
BY

ATTORNEYS

INVENTORS
P. Bass
BY P. J. Waller

ATTORNEYS

Sept. 29, 1970  P. BASS ET AL  3,531,586
SUBSCRIPTION PROGRAM SYSTEM WITH DEBIT AND CREDIT SIGNALLING
Filed April 19, 1965  9 Sheets-Sheet 8

INVENTORS
P. Bass
BY P. J. Waller

ATTORNEY

3,531,586
Patented Sept. 29, 1970

1

3,531,586
**SUBSCRIPTION PROGRAM SYSTEM WITH DEBIT
AND CREDIT SIGNALLING**
Patrick Bass, London, and Peter John Waller, Chelmsford, England, assignors to R. & R. Research Limited
Filed Apr. 19, 1965, Ser. No. 449,066
Claims priority, application Great Britain, Apr. 21, 1964,
16,567/64
Int. Cl. H04n 7/10, 7/16, 7/18
U.S. Cl. 178—6                                   41 Claims

ABSTRACT OF THE DISCLOSURE

Subscription program television system comprising means for transmitting debit signals to receiving stations which have durations related to the price of a proffered program and means by which credit signals may be transmitted to receiving stations to restore credit established thereat. The system includes receiving apparatus having means responsive to debit signals to establish a program price and on acceptance of the program to deduct the price from a previous credit, together with means responsive to transmitted debit cancelling signals to return the price establishing means to its initial condition.

---

This invention relates to a wire or radio broadcast system in which a program may be reproduced on payment or effective payment of a specific fee. The term "Program" is intended to include within its meaning any part of a program which part is charged for separately. The invention is particularly applicable to so-called "Pay-Television" systems including those in which some programs may be received free of charge. The system comprises transmitter and receiver equipment, and the invention relates to both equipment, together or separately.

An advantage of the embodiments of the invention described below is flexibility, in that, with small modifications, they can be used in alternative modes of operation, this invention includes within its compass, therefore, various modes of operation of such a broadcast system as that described.

The facilities and features of three modes of operation in which a broadcast system according to the invention can be used are summarized as:

In one mode, which for the present purpose shall be called Mode A, the system incorporates the following features:

(1a) Means for debiting by an amount equal to the specified price of a program, a subscriber's credit established by inserting coins or tokens into a mechanism or apparatus forming part of the receiving means, *before* his reception of the program.

(2a) Means for determining whether a subscriber has established sufficient credit to pay in full the specified price of a program and, if not, to prevent his reception of the program.

(3a) Means for indicating to a subscriber the monetary balance between the specified purchase price of a program and his previously established credit, whether the balance represents a debit, a remaining credit or zero credit.

(4a) Means for cancelling a previously registered debit in respect of a program price if a subscriber has insufficient credit to pay in full for the program, or if a subscriber has sufficient credit but does not indicate his desire to buy the program.

(5a) Means for re-crediting a subscriber who has bought a program if through any circumstance, such as cancellation of a program or a technical breakdown, it is not possible to transmit or complete transmission of

2 the program, with the price of the program or a proportionate amount.

(6a) Means for counting before and during transmission of a program the number of subscribers who buy program thus indicating the revenue from the program, and similar means for counting the number of subscribers who are re-credited (as 5a above) thus indicating the total amount re-credited.

(7a) Means for disconnecting a subscriber from a program channel at the end of a program or at any other time.

(8a) Means for indicating to a subscriber that a "free" program, such as announcements, previews or any other material for which no charge is made, is about to be transmitted or is being transmitted.

In another mode, which will be referred to as Mode B, the system incorporates the following features:

(1b) Means for debiting by an amount equal to the specified price of a program, a subscriber's credit established by inserting coins or tokens into a mechanism or apparatus forming part of the receiving means, during his reception of the program.

(2b) Means for determining whether a subscriber has established sufficient credit to pay in full the specified price of a program and, if not, to prevent his further reception of the program.

(3b) Means for indicating to a subscriber who has not established sufficient credit to pay in full for a program, the monetary balance needed to complete the purchase of the program.

(4b) Means for cancelling a previously registered debit in respect of a program price if a subscriber has insufficient credit to pay in full for the program.

(5b) Features similar to 5a, 6a, 7a, and 8a above.

In a third operational mode, called Mode C, the system incorporates the following features:

(1c) Means for registering an amount equal to the specified price of a program as a deduction from a subscriber's credit established by inserting coins or tokens into a mechanism or apparatus forming part of the receiving means, as a debit, or as part credit deduction and part debit, before or during his reception of the program.

(2c) Means for preventing a subscriber from receiving a program if his receiving means shows a registered debit.

(3c) Features similar to 5a, 6a, 7a and 8a above. It is an object of the invention to provide a subscription program system in which advantageous modes of operation may be adopted.

It is a more specific object of the invention to provide a subscription program system in which debit signals transmitted to subscribers' positions or receiving stations have durations related to the price of a proffered program.

It is also an object of the invention to provide a subscription program system in which credit signals may be transmitted to receiving stations to restore credit established thereat.

It is a further object of the present invention to provide receiving apparatus for a subscription program system including means responsive to transmitted debit signals to establish a price for a proffered program and responsive to acceptance of the program to deduct the established price from a previously established credit, together with means responsive to transmitted debit-cancelling signals for returning said price-establishing means to an initial condition.

It is an additional object of the present invention to provide receiving apparatus for a subscription program system including means responsive to received program terminating signals for providing to the transmitting station an indication of the state of the station.

Yet another object of the invention is to provide receiving station apparatus for a subscription program system including visual signal means operable by an applied direct-current signal.

Features and advantages of the invention will appear from the following description of embodiments thereof, given by way of example, in conjunction with the accompanying drawings, in the several figures of which like elements are denoted by like reference numerals and in which:

FIGS. 1A and 1B show block diagrams representing the essential elements of a pay television system in schematic form;

Figure 2:
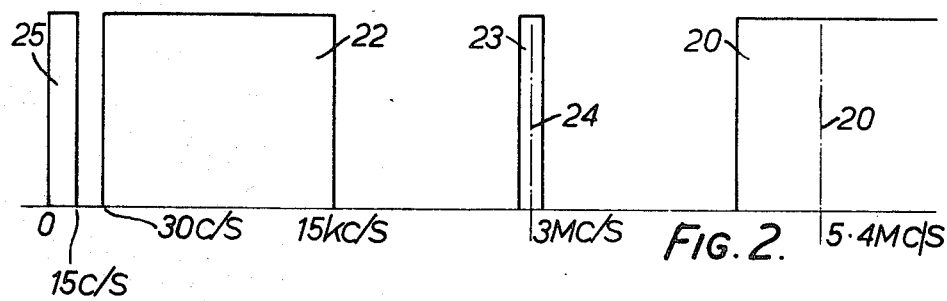
FIG. 2 shows the frequency bands of signals which may be transmitted in a system according to the invention.

FIGS. 1A and 1B, show respectively and in diagrammatic manner, the main components of the transmitting station equipment for one pay television channel and of a typical receiving station equipment, of the system. The transmitting station equipment comprises a television program source 1 and transmitters 2 and 3 for the vision and sound signals respectively, a control signal generator 4 and associated transmitter 5, a generator of signals indicating "free" programs 6 and associated transmitter 7, and a unit 8 which represents the equipment needed to count the audience for each program. The transmitted signals are conveyed to subscribers over a transmission path 9 which also conveys audience measuring signals from the subscribers to the transmitting station.

The transmission path 9 may take many forms. For example, it can be a network of multi-pair cable or of coaxial cable, or of a combination of both types of cable. The network itself can be an existing broadcast relay network distributing broadcast programs on which additional channels can be made available, or to which further cables can be added, to carry the pay television signals. The transmission path 9 can also be the atmosphere and the pay television signals radiated and received by aerials. In this case the audience counting feature, which specifically requires a wire or cable network for its operation, need not be included in the system unless a supplementary network were provided. With radiated transmissions, some form of scrambling or coding equipment for the program signals is needed to prevent unauthorised reception, and each subscriber is supplied with counterpart unscrambling or decoding equipment; one suitable method of scrambling and unscrambling vision signals is described in our U.S. Pat. 3,313,880 and there are numerous methods of obtaining security for sound transmissions known to those skilled in the art of radio engineering.

At the receiving station shown in FIG. 1B, the program signals are applied through a reception inhibiting device 10, which is rendered operative or inoperative by a control unit 13, to a television receiver 11 of conventional design for either wire-borne or radiated signals. In its simplest form the reception inhibiting device 10 is a two-way switch arranged to disconnect the receiver 11 from or to connect it to pay program channel 9. In another form device 10 includes a filter or filters as described in U.S. Pat. No. 3,347,982. Alternatively, device 10 can be an unscrambling or decoding unit, a frequency converter, or a device which when operative converts program signals that cannot be reproduced intelligibly by receiver 11 into signals that could be reproduced intelligibly, or vice versa depending upon the particular embodiment of the system concerned.

Control signals are received over transmission path 9 by control signal receiver 12 and are passed to control unit 13 wherein they are processed and then applied to operate reception inhibiting device 10 and audience counting unit 14 in accordance with the operation mode concerned. Control unit 13 may embody a coin or token operated mechanism, or alternatively, a meter which records the total value of all the programs purchased by the subscriber. The previously mentioned signals indicating that no charge is to be made in respect of a particular program transmission are received by receiver 15 and applied to indicator 16 which may take the form of a flashing light, a bell, a buzzer, a tone sounder or any other device serving to attract the attention of the subscriber.

One particular embodiment of the system designed to operate in accordance with Mode A will now be described in more detail. In the interest of clarity only one pay-television channel will be considered, but this should not be regarded as a limitation of the system and it will become evident that two or more channels could be accommodated if required. It will be assumed that the transmission path 9 is a single pair of wires forming a balanced transmission line which, for example, could be one pair of a multi-pair cable network, and that the vision and sound signals of the pay programs are distributed by the well known methods employed extensively on existing television relay networks of the high-frequency type.

A suitable distribution scheme for all the pay-television signals is shown by way of example only in FIG. 2. The vision signals are transmitted on a carrier frequency of 5.4 mc./s. indicated by chain line 20 with full upper sideband and vestigial lower sideband, within the frequency range 21, while the sound signals are transmitted at audio frequencies in the frequency range 22 from 30 c./s. to 15 kc./s. The control signals are transmitted within a narrow band 23 centred on a carrier wave situated between the sound and vision bands and having in this instance a frequency of 3 mc./s. as indicated by chain line 2. Direct current is employed for the audience counting and "free" program signals, with signal variations restricted to the frequency band 25 below 15 c./s. It is to be understood that this scheme is only one convenient arrangement of signals given by way of example and there are many alternative arrangements which could be used in practice, for example, the vision signals might be transmitted as a modulation of a carrier wave having a frequency of 8.3 mc./s. In this case the full lower sideband and a vestigial upper sideband could be transmitted. The control signal carrier wave could then have a frequency of, for example 10–11 mc./s.

The various types of control signal employed, which are transmitted at the appropriate times as modulation of the 3 mc./s. carrier wave, are shown in FIG. 3. Debit signal 31, shown in waveform 3A will be seen to consist of a direct-current pulse 32 of time duration $t$ preceded by a comparatively short alternating-current pulse 33 of a first frequency $f1$. The debit cancelling signal shown in waveform 3B is a direct-current pulse 34 of duration similar to that of the debit signal but without the preceding alternating-current pulse. The credit signal shown by waveform 3C is an alternating-current pulse 35 of time duration $t1$ and of a second frequency $f2$. The disconnecting signal illustrated by waveform 3D is an alternating-current pulse 36 of arbitrary time duration and of a third frequency $f3$. The first, second and third pulse frequencies $f1$, $f2$ and $f3$ are different in value and in a practical system can be selected in the frequency range below 1 mc./s., avoiding exact harmonic relationships so that they can be readily distingushed from one another by relatively simple filtering means in the subscriber equipment.

Figure 4A:
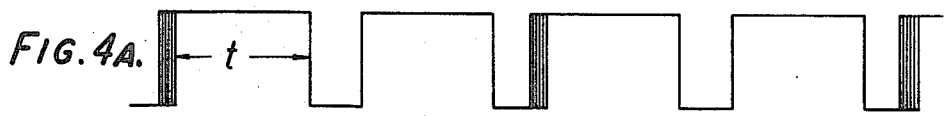
FIGS. 4A and 4B show further waveforms of transmitted signals.
Figure 4B:

During or shortly before the transmission of a particular program offered to subscribers for sale, or continuously both during a short period before the program begins and during the early stages of the program, debit signals and debit cancelling signals are transmitted alternatively in a repeated sequence as illustrated in FIG. 4A. The time duration $t$ of each direct current pulse of the signals is adjusted at the transmitting station to indicate in analogue form the designated price of the program. During the same period a continous sequence of identical audience counting signals may be transmitted in synchronism with the debit signals and debit cancelling signals as illustrated in FIG. 4B. Each audience counting signal consists of a direct-current pulse applied directly to the pair of wires forming the transmission path, and commencing a finite time after the corresponding direct-current pulse of the debit signal or debit cancelling signal and finishes a finite time before that pulse, as illustrated by the broken lines in FIG. 4. The leading and trailing edges of the audience counting pulses are rounded because the frequency components are restricted to values below 15 c./s. in order to avoid interference with the program sound signals and other signals carried on the transmission path. Since the debit signals and debit cancelling signals are carrier-borne while the audience counting signals are applied directly to the transmission path, no interference occurs between the respective pulses of these signals.

Figure 5:
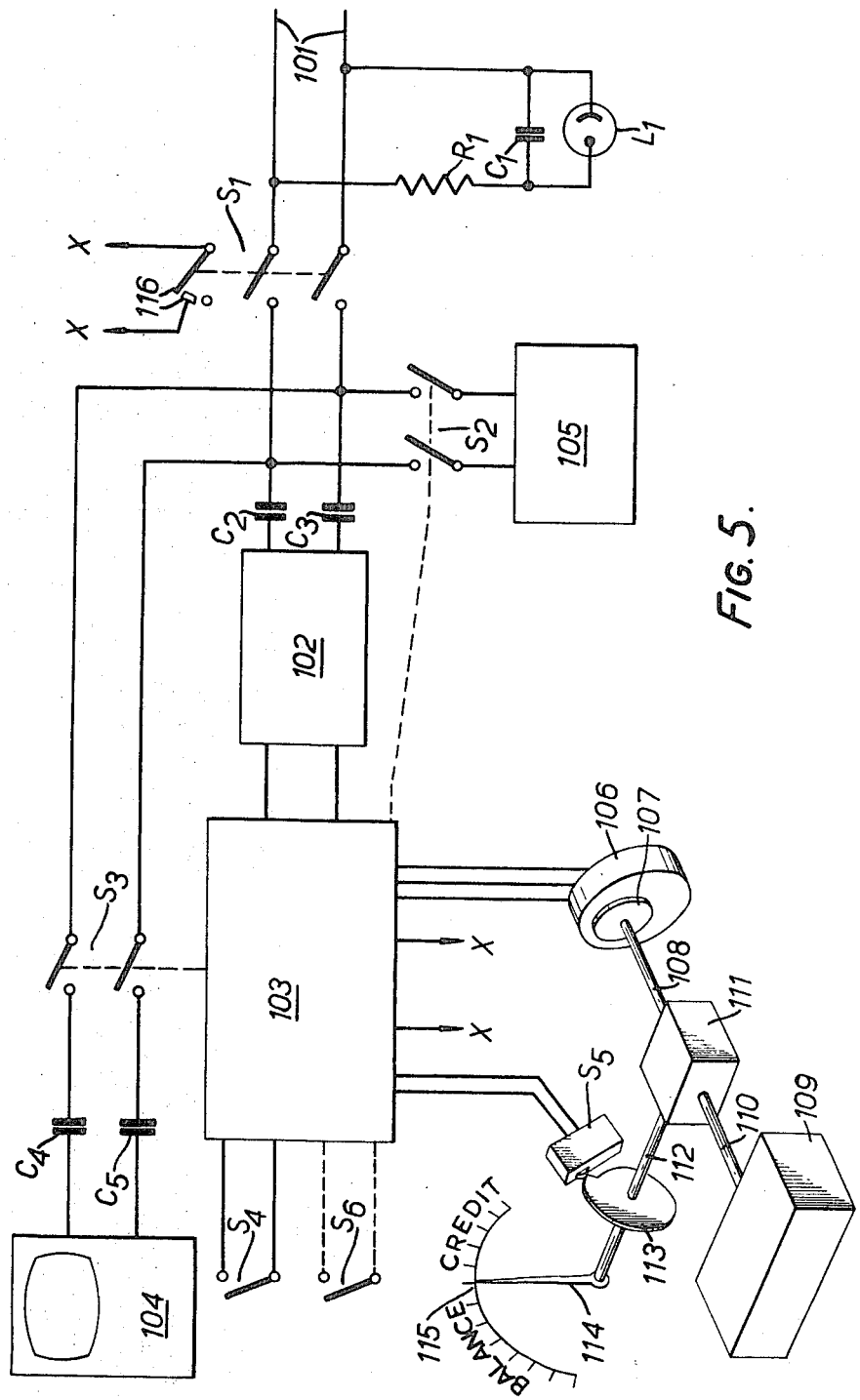
FIG. 5 shows, partly in schematic form, a circuit arrangement for a receiving station in a system according to one embodiment of the invention.

An outline diagram of one embodiment of a receiving station is shown in FIG. 5. The pair of wires 101 corresponds to the transmission path 9 of FIG. 1, and switch S3 to the reception inhibiting device 10. To receive a proffered program the subscriber must first operate switch S1 which connects the transmission path 101 to the control signal receiver 102. This receiver is permanently tuned to the control channel frequency of 3 mc./s., and the demodulated output signals as shown in FIG. 4A are applied to the control circuit 103. The action of operating switch S1 also causes a momentary short circuit across terminals XX via contacts 116 which conditions the control circuit 103 so as to respond to the first alternating-current pulse of the debit signal of frequency $f1$ received after switch S1 is operated. The direct-current debit pulse immediately following the alternating-current pulse causes a synchronous motor 106 to operate in a "reverse" direction for the duration $t$ of the direct-current pulse. Motor 106 is mechanically coupled through reduction gears contained in a gear-box 107 to one input shaft 108 of a differential gear 111 and causes the output shaft 112 of the differential gear 111 to rotate in the anti-clockwise direction as viewed in FIG. 5 through an angle proportional to the price of the program offered for sale.

The other input shaft 110 of differential gear 111 is rotated by a coin mechanism 109 which causes the output shaft 112 to rotate in the clockwise direction through an angle proportional to the value of coins deposited into coin mechanism 109. Alternatively, a token operated mechanism as described in U.S. Pat. No. 3,249,194. The credit established by inserting coins or tokens into mechanism 109 is indicated by a pointer 114, which is attached to shaft 112, on a dial 115. A cam 113 also attached to shaft 112 is designed to operate a microswitch S5 when credit has been established in the manner described or when zero credit is indicated.

When the subscriber operates switch S1 as already stated motor 106 runs in the "reverse" direction for a period of time $t$, determined by the duration of one direct-current pulse of the debit signal. The subscriber thus observes pointer 114 to move from the position on dial 115 indicating his established credit, in the anticlockwise direction as viewed in FIG. 5, through an angular displacement corresponding to the price of the proffered program. If the subscriber has not previously established sufficient credit to pay for the program, the pointer 114 will come to rest in the "balance" region of dial 115 thus indicating the amount required to complete the purchase of the program. As the pointer 114 enters the "balance" region, microswitch S5 will open and condition the control circuit 103 so that it will respond to the debit cancelling signal following a short while after the debit signal as shown in FIG. 4, and cause the motor 106 to run in the forward direction for time $t$ determined by the duration of the debit cancelling signal, thus re-establishing the subscriber's credit.

In order to receive the program the subscriber must insert coins or tokens into mechanism 109 to establish sufficient additional credit as previously indicated, or a greater amount, and then operate switch S1, again. Although this switch will already be in the closed position, it is designed so that a further operation will again momentarily short circuit contacts 116 while leaving the remaining contacts in the closed position. The control circuit 103 will thus respond to the next debit signal and the cycle will be repeated except that on this occasion the pointer 114 will not enter the "balance" region of dial 115 but will indicate the subscriber's remaining credit after paying for the program. Nevertheless, should the subscriber decide not to accept the program, the control circuit 103 will respond to the following debit cancelling signal thus re-establishing his credit as before. In order to accept the program the subscriber is required to operate switch S4 during the interval period between a debit signal and the subsequent debit cancelling signal, that is to say while pointer 114 is at rest and indicating remaining credit. To facilitate the operation of the system, the acceptance switch S4 may take the form of a push-button which is illuminated only during this period.

Once switch S4 has been operated the control circuit 103 is prevented from responding to the ensuing debit cancelling signal so that pointer 114 continues to indicate the amount of credit remaining. This operation also causes switch S3 to operate, thus connecting the subscriber's receiver 104 to transmission path 101 and enabling him to receive the program. Receiver 104 may be a standard design of wired-television receiver as used extensively on existing television relay networks of the high-frequency type, or it may be a conventional receiver designed for use with an aerial but adapted for wired reception by means of a converter attachment in accordance with established relay practice.

After the subscriber has purchased a program in the manner described, it may occur that through some circumstance such as cancellation of the program or a technical breakdown, it is not possible to transmit or complete the transmission of the program. In this case the subscriber's credit can be restored, in whole or in part by the transmission of a credit signal, which can be of the form illustrated in FIG. 3C. This signal is an alternating-current pulse of frequency $f2$ and having a time duration $t1$ proportional to the amount with which the subscriber is to be credited. The pulse is applied to control circuit 103 which causes motor 106 to rotate in the "forward" direction for the duration of the pulse so that pointer 114 moves in the clockwise direction as viewed in FIG. 5, to register the increment of credit above his existing or remaining credit.

In normal circumstances, after the program has finished, the subscriber's receiver must be disconnected from the transmission path 101 to prevent his receiving the next program without payment. This is effected by transmitting a disconnecting signal of the form shown in FIG. 3D, which is an alternating-current pulse of arbitrary time duration and of a third frequency $f3$. This pulse is recognized by the control circuit 103 which responds to cause switch S3 to return to the "off" position, that is the position shown in FIG. 5, thus disconnecting the subscriber's receiver 104. To receive the next program, the subscriber must again operate switch S1 and the operational cycle already described is repeated.

The number of subscribers who buy each program may be counted as the individual transactions take place by applying, by means of switch S2, a load 105 of known value across the two wires 101 forming the transmission path during the periods motor 106 is running, whether in the forward or reverse directions. The load 105 is designed to draw a constant direct current over a wide range of applied direct voltage and also to present a very high impedance to any alternating current signals in the transmission path 101 so that the alternating current drawn is negligible. The applied load therefore draws current from the audience counting signal shown in FIG. 4B. In a practical system the voltage amplitude of the alternating-current pulses forming this signal might be for example 50 volts as applied at the transmitting station. The voltage is attenuated along the transmission path owing to the voltage drop across the series resistances of the two wires which form the path, and the constant current characteristic is necessary to avoid measurement errors arising from this attenuation.

The total direct current flowing into the transmission path is measured at the transmitting station as each audience counting pulse is transmitted. The reading obtained on each pulse represents the total current drawn by all the subscriber loads connected at the time, together with the network leakage current, which will vary with the atmospheric conditions. Referring again the FIG. 4, the reading obtained during each debit cancelling pulse on audience counting pulse (ii) is subtracted from the previous reading obtained during the associated debit pulse on audience counting pulse (i), thus giving a result which represents the total current drawn by the loads of those subscribers who purchase the program during that particular pulse sequence. Since each subscriber load is designed to draw the same known current irrespective of the loading conditions on the transmission path the number of subscribers concerned may be calculated from the result by simple division, and the sum total of the results obtained during all the pulse sequences associated with a particular program thus indicates the total number of subscribers who purchased that program.

The number of subscribers who are credited in the manner previously described may also be counted in a somewhat similar fashion. In this case the loads of all the subscribers concerned are applied simultaneously across the two wires 101 forming the transmission path, while the credit signal shown in FIG. 3C is being transmitted and motor 106 is running. One audience counting pulse of the type shown in FIG. 4B is transmitted during the credit signal, and another immediately following the credit signal. The total direct current flowing into the transmission path during the first of these pulses consists of the total load current plus the network leakage current, whereas the total direct current flowing during the second pulse is the network leakage current only, so that a simple subtraction calculation gives the true value of total load current thus indicating the total number of subsribers who were credited. It is convenient to use the transmission path for counting subscribers in this particular embodiment of this system, but in other instances a separate pair of conductors may be used for the purpose.

Figure 3A:
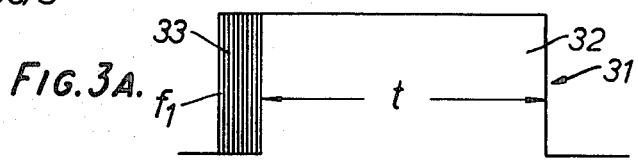
FIGS. 3A–3D show the waveforms of signals transmitted in one embodiment of the invention.
Figure 3B:
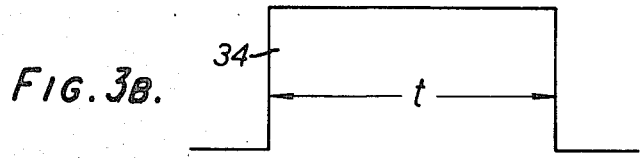
Figure 3C:
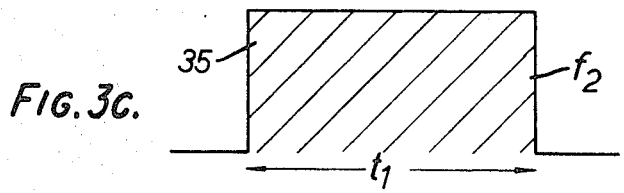
Figure 3D:
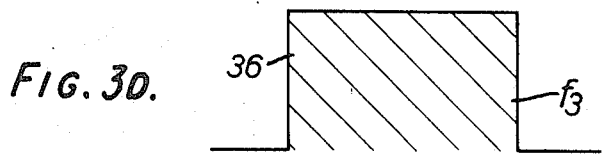

When it is required to transmit announcements, previews or program material for which no charge is to be made, a succession of short alternating-current pulses of frequency $f1$ is transmitted on the control carrier wave, each pulse being similar to the alternating-current pulse of the debit signal shown in FIG. 3A; neither the direct-current pulses of the debit signals nor the debit cancelling signals normally transmitted for a pay program as shown in FIG. 4A are used in this instance. While the "free" program transmissions are in progress there is applied to the two wires 101 forming the transmission path a direct voltage which charges capacitor C1 through resistor R1, shown in FIG. 5. When the charge of capacitor C1 reaches the striking voltage of the gas filled lamp L1 connected across it, the lamp flashes and partially discharges the capacitor which is then charged again and in this way the lamp flashes continuously thus indicating to the subscriber that a "free" program is being transmitted. A typical striking voltage of the lamp is 75 volts and the direct voltage applied to the wires 101 may be of the order of 100 volts. The peak voltage of the D.C. audience counting pulses shown in FIG. 4B must be below the striking voltage of the lamp to prevent the lamp from flashing when the pulses are applied and thus misleading the subscriber into believing that a "free" program is being transmitted when the audience for a pay program is in fact being counted.

There are several variants of the embodiment of the system designed to operate in accordance with Mode A which has been described. For example, the design of control circuit 103 shown in FIG. 5 can be modified so that when subscriber operates switch S1, motor 106 operates as previously described, thus indicating on dial 115 the amount required to complete the purchase of the program or the subscribers remaining credit, but the circuit will not automatically respond to the following debit cancelling signal to re-establish the subscriber's credit. A further switch S6 is added to the control circuit 103, which must be operated by the subscriber to regain his credit. Operation of switch S6 causes the control circuit 103 to respond to the next subsequent debit cancelling signal in the sequence shown in FIG. 4A transmitted after the operation of the switch. If the subscriber operates switch S4 and has inserted coins or tokens to a value sufficient to pay for the program the program is connected, but if on the other hand the subscriber operates switch S6 his payment is returned in the form either of credit towards his future viewing or of the actual coins. The advantage of this method of operation is that if after operating switch S1 to register the price of the program the subscriber finds that he is required to insert coins to complete the purchase of the program, he may do so while the price remains registered and he will see pointer 114 move from the "balance" region of dial 115 into the "credit" region as the coins are inserted. As soon as pointer 114 enters the credit region, microswitch S5 will operate and thereby activate switch S4 which may then be operated by the subscriber to cause the program to be received.

The number of subscribers who accept each program is counted in a somewhat different manner with this variant of Mode A. It is now arranged that the program measurement load 105 shown in FIG. 5 is applied across the two wires 101 forming the transmission path, by means of switch S2 for a predetermined period of time commencing from the leading edge of the first debit cancelling pulse received by the control circuit 103 after the subscriber has operated switch S4 to receive the program (see FIG. 4A). The period of time during which switch S2 is closed may be equal to the time duration of the debit cancelling pulse which will depend on the price of the program, or alternatively this period may be constant and not related to the price of the program—a typical value in a practical system is two seconds. In this instance the debit cancelling pulse is used to synchronise the time at which the load is applied so that the loads of all those subscribers who have accepted the program since the transmission of the previous debit cancelling signal are applied across the two wires 101 and can be measured at the transmitting station at the same time. The reading obtained represents the total current drawn by the loads plus the network leakage current. During the debit pulse that follows the debit cancelling pulse, the leakage current is measured by itself and subtracted from the previous reading thus giving the total current drawn by the loads of these subscribers who purchased the program during that particular pulse sequence. The results obtained during all the pulse sequences associated with each program are totalled to indicate the total number of subscribers who purchased the program.

The design of the system may be modified to operate in accordance with Mode B by inter-linking switches S1 and S3 shown in FIG. 5 so that when the subscribed operates switch S1 the control circuit 103 causes switch S3 to operate on reception of the next alternating-current pulse of the debit signal, thus connecting the subscriber's receiver 104 to transmission path 101 and enabling him to receive the pay program before the price is registered. The ensuing direct-current pulse of the debit signal operates motor 106 and the price of the program is registered by pointer 114 on dial 115 as previously described. If the subscriber has established sufficient credit to pay for the program, registration of the price will not cause pointer 114 to enter the "balance" region of dial 115, and the pointer will come to rest indicating his remaining credit. On the other hand, if the subscriber has insufficient credit to pay for the pragram, microswitch S5 will operate as the pointer 114 enters the "balance" region of dial 115 and cause the control circuit 103 to switch off S3 thus disconnecting receiver 104 from transmission path 101, and preventing further reception of the pay program. The subscriber then has a choice of inserting coins into mechanism 109 to pay the indicated balance required to complete the purchase of the program or of cancelling the registered debit and not seeing the program.

Operation of the system in accordance with Mode C is similar to that of Mode B except that if the subscriber has insufficient credit to pay for the program, his receiver 104 will *not* be disconnected as the pointer 114 enters the "balance" region of dial 115 when the price of the program is registered, and he will be allowed to see the whole program provided that he was not already in debt when he accepted the program. However, as pointer 114 enters the "balance" region of dial 115, microswitch S5 operates as before, but in this instance the microswitch conditions the control circuit 103 so that the subscriber is unable to accept a further program until he has inserted coins into mechanism 109 to clear the registered debit in respect of the previous program. As the coins are inserted, pointer 114 re-enters the "credit" region of dial 115 and microswitch S5 operates again to allow control circuit 103 to connect switch S3 when the subscriber operates switch S1.

Figure 6:
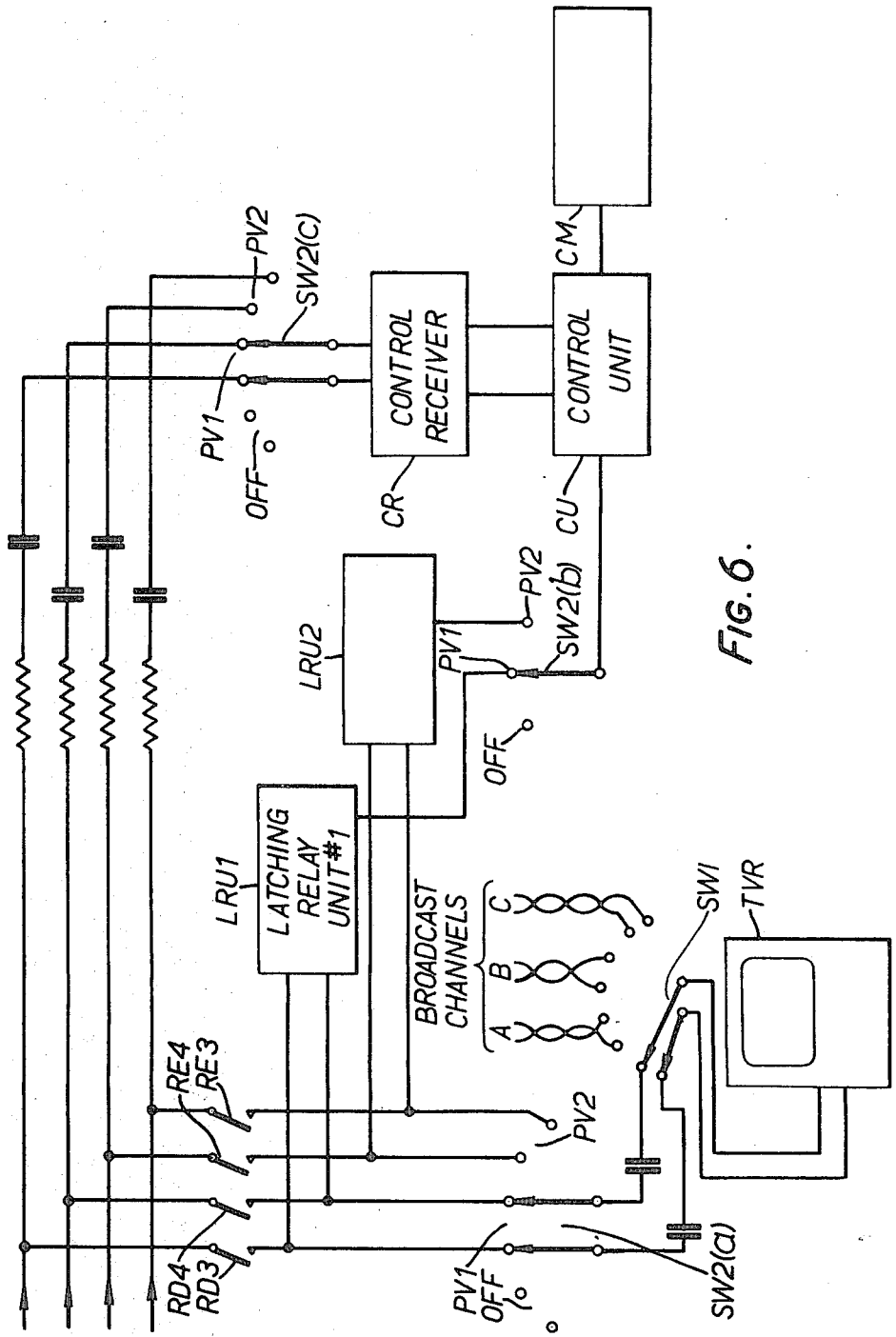
FIG. 6 is a partly schematic diagram of an alternative embodiment of receiving station equipment.
Figure 7A:
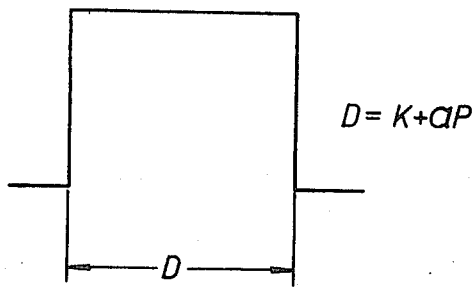
FIGS. 7A–7D show waveforms of alternative forms of transmitted signals.
Figure 7B:
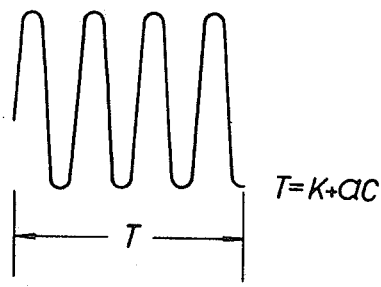
Figure 7C:
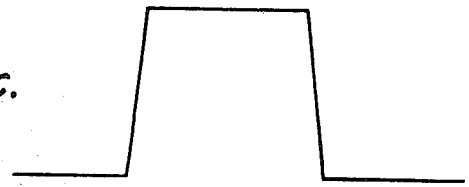
Figure 7D:
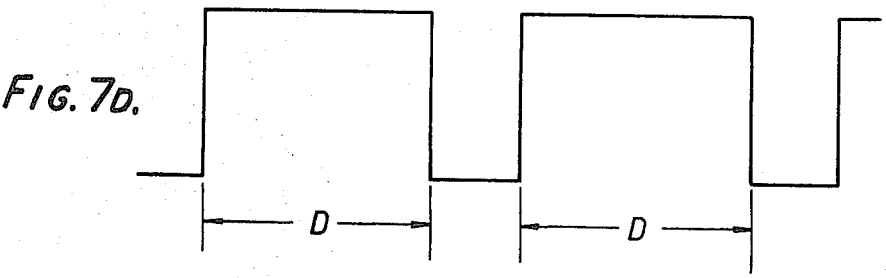

FIG. 6 is a schematic diagram showing the arrangement of another embodiment of receiving station equipment. In this case the multi-pair distribution network consists of five pairs of wires, each pair providing a television channel. Channels PV1 and PV2 are used for pay-television programs, while channels A, B and C are occupied by other broadcast programs which are distributed in accordance with well established practice in relay engineering and which the subscriber may select by adjusting a program selector switch SW1. In order to obtain a pay-television program the subscriber must first adjust switch SW1 to the "PV" position and then set the pay-channel selector switch SW2 to either position PV1, or position PV2, according to the program he wishes to see. The control signals, which in this embodiment are transmitted as frequency modulation of a carrier wave which may have a frequency of, for example, 3 mc./s., are applied to a control receiver, the demodulated output of which feeds a control unit. If a program price signal is being transmitted the control unit will cause a motor-driven dial to rotate for a period of time proportional to the program price. The dial is calibrated in suitable units of value and thus, in moving past a fixed index, will indicate the program price.

If it be assumed that the subscriber has established sufficient credit to meet the cost of the program by previously inserting coins into a coin mechanism to a value indicated by a second dial moving past its own index, he is able to accept the program and pay for it by pressing an "acceptance" switch. When this switch is operated the credit dial is coupled to the program dial by an electromagnetic clutch and at the same time the motor which drives the price dial is energized to run in the reverse direction. The motor causes the program price and credit dials to turn together until the price dial has returned to zero, thus reducing the credit by the amount of the price. The clutch is then disengaged, but the motor continues to turn the price dial beyond its zero or "paid" position to a "rest" position whence it started. In addition to releasing the clutch, the passage of the price dial through the "paid" position causes the channel latching relay in latching relay unit LRU 1 or LRU 2 to be energized, thus connecting the selected channel to the television receiver TVR, by way of the latching relay contacts RD3, RD4, or RE3, RE4 and the selector switches SW1 and SW2.

At the end of the program a direct-current pulse is transmitted on the network. This pulse is fed to an Instantaneous Broadcast Audience Counting or "IBAC" circuit, contained in the latching relay unit LRU 1 or LRU 2, which responds to the measuring signal in a manner to be described later so that the total audience may be counted at the transmitter station. The trailing edge of the IBAC pulse releases the latching relay, thus opening its contacts and disconnecting the subscriber's television receiver from the pay channel.

The control signals transmitted on the channel selected by switch SW2 pass from that channel by way of the contacts of switch section SW2(c) to a control receiver CR, the structure and function of which is described below in rather more detail. For the present it is sufficient to note that the control receiver provides to a control unit CU signals related to the control signals transmitted on the selected channel.

Figure 8:
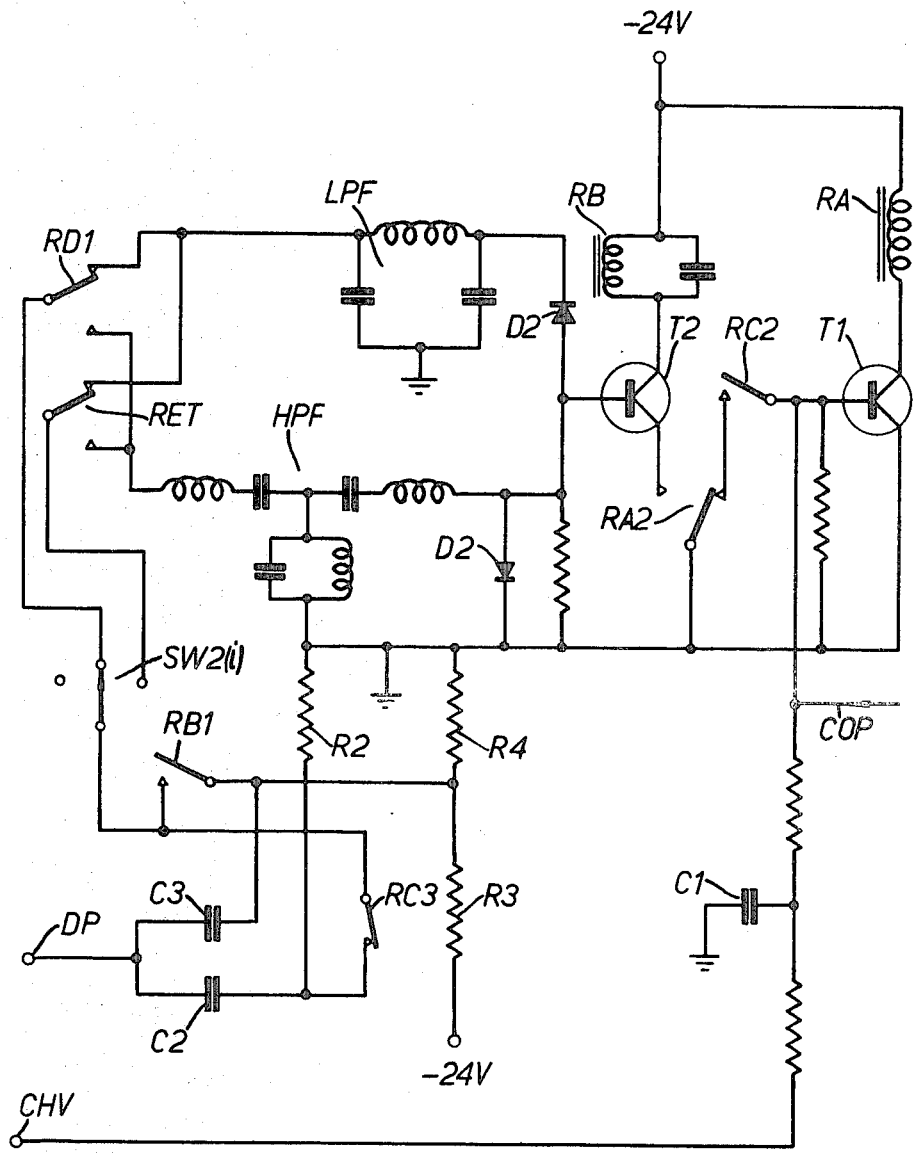
FIG. 8 shows detailed circuits for part of the apparatus described in relation to FIG. 6.
Figure 9:
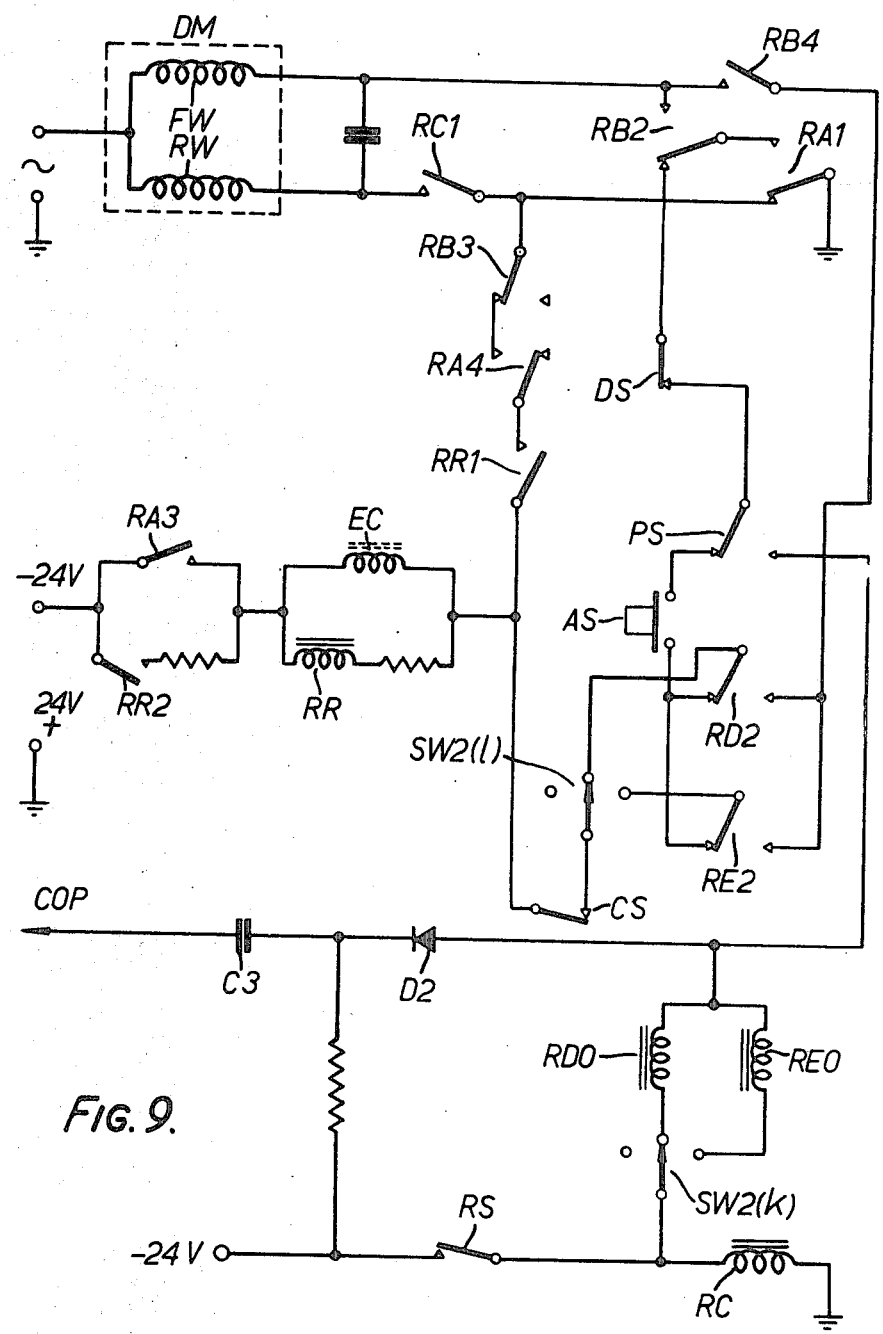
FIG. 9 shows detailed circuits for another part of the apparatus described in relation to FIG. 6.

Control unit CU, the structure and functions of which are described in detail below in relation to FIGS. 8 and 9, serves to develop signals appropriately controlling the functioning of the latching relay for the selected channel and of the associated coin mechanism, CM, which includes the price dial and credit dial already mentioned. The structure and function of coin mechanism CM is further described below in relation to FIG. 10.

Control and audience counting signals suitable for use with this embodiment of receiving station equipment are illustrated by FIG. 7. The price control signal, illustrated by waveform 7A, consists of a direct-current pulse having a duration which is related to the price of the proffered program. A fixed initial period K is required in order to provide a free program facility as described later. The duration of the pulse is thus $D=K-aP$, where P is the price to be changed and $a$ is an appropriate constant of proportionality. Credit control signal 7B is an alternating current pulse having a suitable frequency and a duration representing the amount of credit which is to be given. The duration T of this pulse is given by $T=K-aC$, where K and $a$ have the same values as above and C represents the amount of credit. The audience measurement signal, which also serves in this embodiment as the program termination signal, is constituted by a direct-current pulse which is illustrated by waveform 7C. It will usually be advantageous, at least at the beginning of the program to transmit the price pulses in a repeated sequence as illustrated in waveform 7D.

Further details of the apparatus described above in relation to FIG. 6 will now be given with reference to FIGS. 8, 9, 10 and 11.

The control receiver CR of FIG. 6 includes only conventional circuits well known as performing the described functions and will, therefore, be only generally described.

The receiver includes selective transistor circuits providing substantial gain in the frequency range of the frequency-modulated control signal carrier, together with a conventional type of balanced frequency discriminator. One of the carrier-frequency amplifier stages may have the discriminator output signal applied reflexly to its input, a low-impedance demodulated output being taken from the emitter of the transistor.

A carrier-frequency signal is also applied to a rectifier circuit within the receiver. This rectifier circuit yields a carrier hold voltage at all times when the control carrier wave is being received.

The operation of the control unit and coin mechanism will now be described with particular reference to FIGS. 8, 9, 10 and 11. It will be assumed that the subscriber has adjusted switch SW2 from the "off" position to position "PV1" at a time when debit signals as described above in relation to FIG. 7D are being transmitted on that channel, and that the price dial mechanism is initially in a "reset" condition. Under these conditions the negative "carrier hold" voltage received from the control receiver at input CHV of FIG. 8 will build up across capacitor C1. When the voltage across C1 has become sufficient a transistor T1, to the base of which this voltage is applied, will pass current and thus operate a relay RA, the operating coil of which is connected in series with the emitter-collector path of transistor T1 across a 24 v. supply which has its positive terminal earthed.

Contact RA2 of relay RA then earths the emitter of a further transistor T2, while contact RA1 (FIG. 9) changes over to prepare the forward circuit of a drive motor DM.

Figure 10:
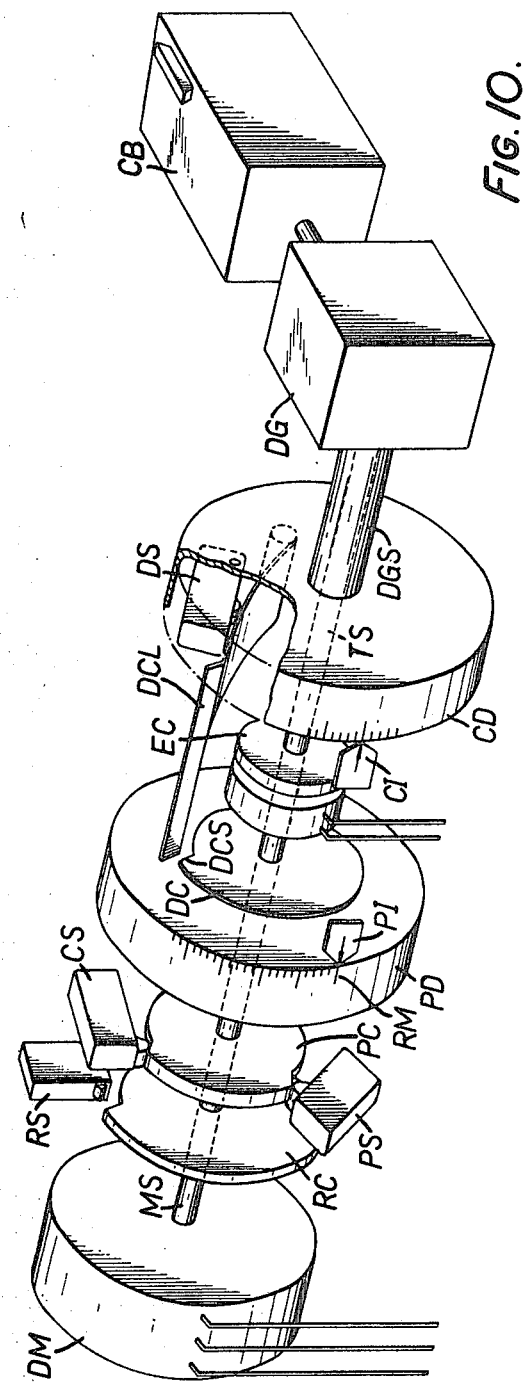
FIG. 10 shows schematically part of the apparatus described in relation to FIG. 6.

When a debit pulse is received by the control receiver, the demodulated direct-current pulse will be received at input DP in FIG. 10. This pulse is differentiated by a capacitor-resistor combination C2, R2, and is applied by way of relay contact RC3, the contacts of switch portion SW2(i) and another relay contact RD1 to the base of transistor T2. The differentiating action of C2, R2 and the polarity with which diode D1 is connected ensure that transistor T2 can be turned on only by the leading edge of a debit pulse.

Transistor T2 thus conducts in response to the leading edge of the debit pulse, so that current passes through the operating coil of a further relay RB, which is connected between the collector of transistor T2 and the —24 v. supply line, and the relay is thus operated. Relay contact RB1 close to connect a forward bias, derived from a tapping on a voltage divider composed by the resistors R3 and R4 connected in series across the 24 v. supply, to the base of transistor T2 by way of switch contacts SW2(i), relay contact RD1, low-pass filter LPF and diode D1. Relay contact RB2 (FIG. 9) changes over, thus connecting the forward winding FW of motor DM across a 24 v. alternating-current supply, of which one terminal is earthed by way of relay contact RA1. Motor DM is thus driven in the "forward" direction.

Referring now to FIG. 10, the "forward" direction of motor DM is anticlockwise, and the condition shown is that shortly after the motor has commenced to run in the forward direction. It will be seen that immediately motor MD commences to run the operating face of a reset cam RC secured to the motor shaft moves away from a reset switch RS, which thus closes to connect the operating coil of a relay RC across the supply.

Motor DM continues to run during the whole period of the debit pulse, causing a price dial PD, which rotates with the output shaft MS of motor MD, to rotate past a fixed index PI until at the end of the debit pulse the price of the proffered program is shown against the index. At the termination of the debit pulse the signal resulting from the differentiation of the pulse by capacitor C2 and resistor R2 is applied by way of relay contact RB1 to the base of transistor T2. As this signal is positive-going transistor T2 is thus cut off, so that relay RB is released, contact RB2 in the motor supply circuit (FIG. 9) changes over and the motor stops. Relay contact RB1 opens when relay RB releases and contact RC3 opens when relay RC operated as described above, so that further debit signals are without effect upon the circuit as there is no path by which they may reach transistor T2.

Upon the output shaft MS of motor MD is also mounted a differential cam DC having a step DCS. This cam cooperates with a lever DCL actuating a differential switch DS. Switch DS is carried upon a credit dial member CD which is fastened upon the hollow shaft DGS of a differential gear box DG, to which are also connected a coinbox mechanism CB and a transfer shaft TS which may be engaged by way of an electromagnetic clutch EC with output shafts MS of motor DM. Coinbox CB may be of the kind already described in relation to FIG. 5. The arrangement of differential gear box DG is such that credit dial DG may be turned through an amount equal to the rotation of price dial PD when clutch EC is engaged, or may be turned through amounts proportional to the value of coins inserted in coinbox mechanism CB. Credit dial CD carries a calibration such that the amount of the credit may be read against a stationary index CI.

The positions of cam DC and lever DCL are such that if, in response to a received debit pulse price dial PD rotates anticlockwise by an amount representing a price not exceeding the value of the credit recorded by credit dial CD, then differential switch DS will remain closed. If now the subscriber actuates acceptance switch AS, an operating circuit is established for the operating winding EC of the electromagnetic clutch (FIG. 9) from the —24 v. supply by way of relay contact RA3 to the parallel-connected operating coils of the electromagnetic clutch EC and of a relay RR, thence by way of the credit switch CS, relay contact RD2, acceptance switch AS, paid switch PS, differential switch DS and relay contacts RB2 and RA1 to earth.

As long as acceptance switch AS is pressed, an operating circuit for the reverse winding RW of motor DM is established by way of relay contacts RC1, RB3, RA4, RR1 and thence to earth by the path described above. The motor thus runs in the reverse direction, that is, anticlockwise as shown in FIG. 10. Since clutch EC is energised as described above, the credit dial CD and the program price dial PD rotate together in the anticlockwise direction, reducing the price and the credit displayed by equal amounts, until the price dial reads zero. A cam PC attached to motor output shaft MS then changes over the paid switch PS, thus breaking the operating circuits for clutch EC, motor winding RW and relay RR and completing an operating circuit for the operating winding RDO or REO of the channel latching relay selected by switch section SW2(k), by way of paid switch PS, differential switch DS, and relay contacts RB2 and RA1 to earth. The relay then operates and is latched in the operated position. As the potential at the junction point of relay winding and switch contact PS changes from the supply potential of —24 v. to earth potential there arises at this point a negative-going change in potential which is applied by way of a diode D2, a capacitor C3 and a lead COP to the base of transistor T1, which is thus cut off. Owing to the presence of capacitor C3 this condition does not persist, but it does last long enough for relay RA to release, thus providing by way of relay contacts RA1 and RC1 an alternative operating path for reverse winding RW of motor DM. The motor thus continues to run, causing price dial PD to rotate past the zero point to the reset position at which reset cam RC operates reset switch RS. When this occurs relay RC releases, contact RC1 opens and the motor stops. Relay contact RC2, which has locked the base of transistor T1 to earth potential, now opens and, the pulse via lead COP having ceased, relay RA again operates.

At this stage in the cycle of operations pricing dial PD has returned to the reset position from which it started, relay RA is operated, relay RB has released, and relay RD is latched in its operated condition. Relay contacts RD3 and RD4 (FIG. 6) are closed to connect the signals from the selected pay channel to the television receiver TVR and to the latching relay unit LRU1, which contains the IBAC circuits already mentioned.

If the accept switch AS is not operated after the price of the proffered program has been set on the price dial as described above, then this price will remain displayed until the transmission of the control carrier is interrupted. When this occurs, transistor T1, which is normally held conductive by the carrier hold voltage applied to its base from the control receiver, is cut off so that relay RA releases and an operating circuit for the reverse winding RW of motor DM is completed to earth by way of contacts RC1 and RA1.

If it should happen that the price of the proffered program as shown on the pricing dial at the end of the debit pulse is greater than the amount of credit shown on the credit dial, then differential switch DS will open and render acceptance switch AS inoperative, even if pressed. To obtain the program it is then necessary to insert coins of sufficient value to cause the credit shown to exceed the cost of the program as shown on the price dial. When this has been done, differential switch DS closes and acceptance switch AS may then be operated to obtain the program as described above.

If the subscriber wishes to return the price dial to zero without accepting the program, switch SW2 may be set to the "off" position, this interrupts the control carrier and produces the action described above by which the price dial is returned to the reset position.

When it is desired to receive a program on channel PV2 the procedure and circuit operation are exactly as described above, save for the setting of switch SW2 to the "PV2" position which finally results in the operation of latching relay RE to connect channel PV2 to receiver TVR.

As has already been mentioned, the initial portion of the debit signal may be used to provide a free program facility. When switch SW2 is set to a channel on which such a free program is to be provided, the receipt of the brief initial portion of the debit pulse caused motor MD to be driven forward as in the pricing operation already described. The duration of the debit pulse is, however, only sufficient to shift the price dial from the "reset" position to the "zero" position. When the motor stops the paid switch PS does not operate and an operating path for the appropriate latching relay coil RDO or REO is completed via switches PS and DS and by way of relay contacts RB2 and RA1. The operating arrangements for the differential switch DS are such that even though the credit dial may show zero credit a free program may still be received.

It is also possible to re-credit subscribers with the price of an accepted program, or part of this price, should this become desirable owing to the unforeseen cancellation of a program or owing to a technical breakdown. This operation is effected as follows:

It may be recalled that after acceptance of a program relay RA is operated, relay RB is released, relay RC is released and one of the latching relays RD and RE is latched on. Since contacts RD1 or RE1 (FIG. 8) have thus changed over the demodulated output signal from the control receiver, received at DP, is now applied to the base of transistor T2 by way of a band-pass filter BPF. This filter has a bandwidth which is wide enough to pass the credit signals, described in relation to FIG. 7B, but has substantial attenuation outside this pass-band, especially in the lower-frequency region. Debit signals arriving after a latching relay has operated therefore do not reach transistor T2 through this path. When a credit signal is transmitted, however, it passes through band-pass filter BPF, is demodulated by diode D3 and turns on transistor T2, thus energising relay RB.

Relay contact RB2 then completes a "forward" drive circuit for motor DM and the motor thus turns the price dial forward from its initial "reset" position. When the price dial passes through the "zero" position, credit switch CS is operated by cam PC to complete an operating circuit for clutch EC and relay RR, so that the credit dial now turns with the price dial. At the end of the transmitted credit pulse the turn-on voltage at the base of transistor T2 ceases, relay RB releases and the motor stops, while clutch EC and relay RR are de-energised. The price dial will now indicate the amount of the credit given and the credit dial will now show the increased total credit.

During the operation an audience measurement may be made as described below, so that the total of credit given is known.

After the credit operation has thus been effected the control carrier is interrupted so that relay RB is released and the price dial returned to the preset position as previously described. Provided that the selector switch SW2 is still set to the appropriate channel the credit will be given even though the subscriber may have selected a broadcast channel by means of selector switch SW1.

Figure 11:
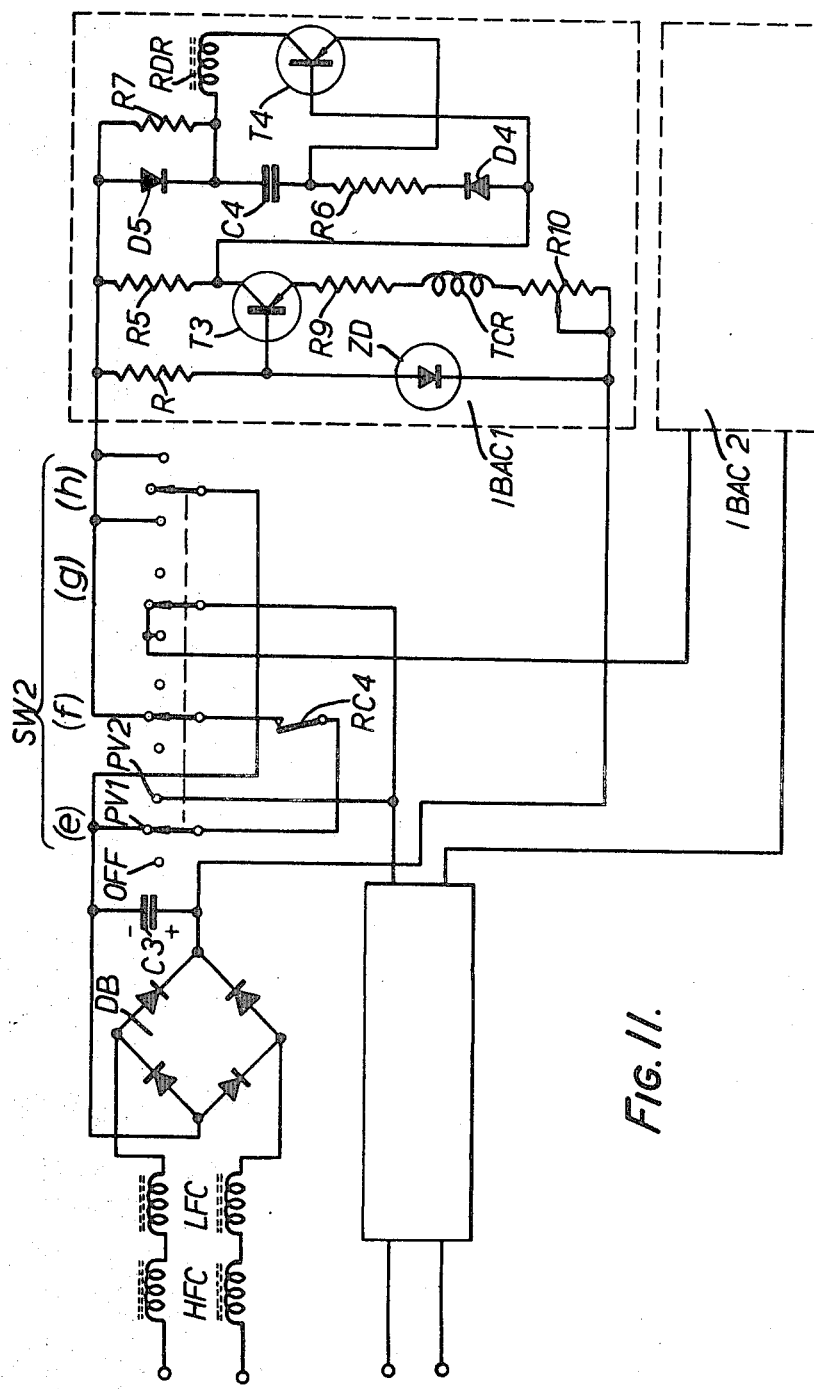
FIG. 11 shows detailed circuits for another part of the apparatus described in relation to FIG. 6.

The method of audience measurement employed (IBAC) in this system has already been described in British patent application No. 6,652/63 and will not be discussed in full detail at this time. The circuit arrangement provided at the receiving station for this purpose, which is included in each latching relay unit of FIG. 6, is shown in FIG. 11. The audience measurement or IBAC pulse, described above in relation to FIG. 7C, is usually applied to the network at the end of a program. Assuming that such a pulse is transmitted on channel PVI and that the latching relay RD for this channel is operated, the direct-current pulse will pass by way of the latching relay contacts RD3, RD4 (FIG. 6) and then by way of high-frequency and low-frequency chokes HFC, LFC (FIG. 11) contained in the latching relay unit to a diode bridge DB. Whatever the polarity with which the direct-current pulse arrives at the bridge (it may be inverted owing to improper connections in the distribution network), it will be applied to the IBAC circuits in the same polarity, so that capacitor C3 will always be charged in the same direction.

Assuming that the circuit is initially in a quiescent condition, the leading edge of the applied pulse will cause a transistor T3 to pass current. The potential appearing across collector load resistor R5 of transistor T3 charges a capacitor C4 by way of a diode D4 and resistors R6 and R7. When capacitor C4 is fully charged, substantially the whole of the current passed by transistor T3 passes through resistor R5. Under these conditions the current drawn by transistor T2 is arranged to be kept constant over a wide range of applied voltage by the provision of a temperature- compensated constant-bias circuit formed by a base voltage divider consisting of a resistor R8 and a Zener diode ZD and an emitter feedback resistor containing resistors R9, R10 and a temperature-compensating element TCR. The total direct current drawn by the program channel under these conditions will thus consist of a first component proportional to the number of subscribers connected to the channel and a second component due to the channel leakage. The current is measured and a record of its value is made by suitable apparatus at the transmitting station. During the falling transient at the end of the direct-current pulse a diode D5, shunting resistor R7 will conduct, so that transistor T4 becomes forward biased and the change stored in capacitor C4 during the initial transient is discharged through the release coil RDR of latching relay RD, which releases the latch and allows the relay contacts to open, thus disconnecting the receiving station from the channel. Immediately after the relays have thus been released, another measuring impulse is applied to the channel so that the leakage current may be measured from the transmitting station. Subtracting the value of leakage current thus obtained from the total current measured by the first pulse yields an accurate measure of the number of subscribers connected.

As previously mentioned, it is necessary to measure the number of subscribers connected to a channel when a credit is given. This measurement is achieved as follows: prior to the transmission of a credit pulse the control signal carrier is switched off at the transmitter to ensure that the program price dials in all receiving stations connected to the channel are returned to the reset position. An IBAC pulse having a slowly-falling trailing edge is then transmitted and the current flowing in the network is measured to obtain a measure of the number of subscribers who are then connected to that channel plus the leakage current. Since the falling transient of this pulse is slow, the release circuits will not operate and the receiving equipments will not be disconnected from the network. The control signal carrier is then switched on again and shortly afterwards the credit signal is transmitted as described above. When the credit signal is received, relay RC will be energised as the price dial leaves the reset position and thus contacts RC4 in the IBAC circuit will open. A second IBAC pulse is then transmitted and the current flowing in the network is again measured, this time to measure the leakage current plus the number of subscribers who purchased the program but are not receiving the credit. Since the two IBAC measurements are closely spaced, it can be assumed that the total network leakage remains constant during the two measurements. The total number of subscribers who receive credit is thus calculated from the difference between the two current readings. A further IBAC pulse with a rapidly-falling trailing edge is then transmitted in order to release the subscribers from the program channel.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. Transmitting apparatus for a subscription program system including a plurality of subscribers' positions, said apparatus including means for transmitting to a plurality of receiving stations, program signals representing at different times during a program cycle a proffered program, debit signals characterizing the price of said program; credit signals and program terminating signals.

2. Transmitting apparatus for a subscription program system including a plurality of subscribers' positions, said apparatus including means for transmitting simultaneously to said positions: program signals representing a proffered program and a carrier wave modulated selectively with debit signals, debit-cancelling signals and program terminating signals.

3. Transmitting apparatus as defined in claim 2 in which said debit signal consists of a pulse of alternating current of a first predetermined frequency succeeded by a direct current pulse of duration proportional to said price.

4. Transmitting apparatus as defined in claim 2 in which said debit signal comprises a direct current pulse composed of a first portion of predetermined constant duration together with a second portion of duration proportional to said price.

5. Transmitting apparatus as defined in claim 2 in which said means for transmitting said credit signal comprises means for transmitting to said positions an alternating current pulse of a second predetermined frequency.

6. Transmitting apparatus as defined in claim 2 in which said means for transmitting said program terminating signal comprises means for transmitting to said positions; a pulse of alternating current of a third predetermined frequency.

7. Transmitting apparatus as defined in claim 1 comprising means for transmitting said debit signals and debit-cancelling signals in alternate succession prior to the transmission of said programme signals.

8. Transmitting apparatus as defined in claim 1 in which said debit signals include a price-determining portion of predetermined duration and including also means for transmitting debit-cancelling signals comprising direct-current pulses of duration equal to that of said price-determining portion of said debit signals.

9. Transmitting apparatus as claimed in claim 2 in which said means for transmitting said debit-cancelling signals comprises means for discontinuing transmission of said sub-carrier.

10. Transmitting apparatus for a subscription program direct-current circuit distribution network comprising means for transmitting first program signals as modulations of a first carrier wave within a first predetermined frequency range, means for transmitting control signals, comprising debit signals, debit-cancelling signals, credit signals and program termination signals, as modulations of a second carrier wave within a second frequency range, means for transmitting second program signals having frequencies within a third frequency range and means for transmitting measuring signals within a range of frequencies including zero frequency.

11. Transmitting apparatus as defined in claim 10 in which said first program signals are television signals and said first carrier wave has a frequency exceeding 5 megacycles per second.

12. Transmitting apparatus as defined in claim 10 in which said first program signals are television signals and said first carrier wave has a frequency exceeding 8 megacycles per second.

13. Transmitting apparatus as defined in claim 10 in which said second carrier wave has a frequency below said first predetermined frequency range.

14. Transmitting apparatus as defined in claim 10 in which said second carrier wave has a frequency in the range of 10–11 megacycles per second.

15. Transmitting apparatus as defined in claim 10 in which each said debit signal consists of a pulse of alternating current of a first predetermined frequency succeeded by a direct current pulse of duration proportional to said price.

16. Transmitting apparatus as defined in claim 10 in which each said debit signal comprises a direct current pulse composed of a first portion of predetermined constant duration together with a second portion of duration proportional to said price.

17. Receiving apparatus for a subscription program system, in which program signals, debit signals, debit-cancelling signals, credit signals and program termination signals are transmitted, comprising in combination: credit register means to establish a variable credit; charge means operated by a received debit signal characterizing the price of a proffered program to reduce the amount of said credit by the amount of said price; program reproducer means; control means rendering said reproducer means selectively operative or inoperative; means operated by said credit register means when said credit becomes zero causing said control means to render said reproducer means inoperative; personally operable means causing said control means to render said reproducer means inoperative; restoring means operable by applied debit-cancelling signals to increase said credit; means operating with said control means to connect received debit-cancelling signals to said restoring means when said reproducer means is inoperative; credit means operable by applied credit signals to increase said credit; means operating with said control means to connect received credit signals to said credit means when said reproducer means is operative; and means operable by received program termination signals to cause said control means to render said reproducer means inoperative.

18. Receiving apparatus as defined in claim 17 and comprising also means controlled by said personally operable means and operating to connect a predetermined load to a measuring circuit.

19. Receiving apparatus as defined in claim 17 and comprising also means controlled by said personally operable means and operating to connect to a measuring circuit a load device drawing a constant current over a wide range of applied voltage.

20. Receiving apparatus as defined in claim 17 and comprising also signal means operable by a further applied signal.

21. Receiving apparatus as defined in claim 19 in which said credit register means displays an indication of said credit.

22. Receiving apparatus as defined in claim 19 in which said credit register means displays an indication of said credit and is operated in response to said debit signal to display the difference in value between said credit and said price.

23. Receiving apparatus as defined in claim 18 in which said credit register means forms a part of a mechanism responsive to the insertion of tokens to establish a credit proportional to the value of said tokens.

24. Receiving apparatus for a subscription program system in which program signals, debit signals, debit-cancelling signals, credit signals and program termination signals are transmitted, comprising in combination: credit register means operable by the insertion of tokens to establish a variable credit proportional to the value of said inserted tokens; charge means operated by a received debit signal characterizing the price of a proffered program to reduce said credit by the amount of said price; program reproducer means operable by received program signals to reproduce said program; control means operable to render said reproducer means selectively operative or inoperative; first personally operable means actuating said control means to render said reproducer means operative; second personally operable means actuating said control means to render said reproducer means inoperative; restoring means operable by applied debit-cancelling signals to increase said credit; means controlled by said second personally operable means to apply received debit-cancelling signals to said restoring means; credit means operable by applied credit signals to increase said credit; means controlled by said first personally operable means to connect received credit signals to said credit means; and means operable by received programme termination signals to cause said control means to render said reproducer means inoperative.

25. Receiving apparatus as defined in claim 24 and comprising also means controlled by said personally operable means and operating to connect a predetermined load to a measuring circuit.

26. Receiving apparatus as defined in claim 24 and comprising also means controlled by said personally operable means and operating to connect to a measuring circuit a load device drawing a constant current over a wide range of applied voltage.

27. Receiving apparatus as defined in claim 24 and comprising also signal means operable by a further applied signal.

28. Receiving apparatus for a subscription program system in which program signals, debit signals, debit-cancelling signals, credit signals and program termination signals are transmitted, comprising in combination: credit register means to establish a variable credit; debiting means operable by applied debit signals to reduce the amount of said credit; program reproducer means operable by applied program signals to reproduce a program represented by said signals; first personally operable means actuating control means, said control means when actuated operating firstly to apply received program signals to said reproducer means and secondly to apply received debit signals to said debiting means; means operated by said credit register means when the value of said credit is reduced to zero to deactuate said control means whereby said reproducer means is rendered inoperative; restoring means operable by applied debit-cancelling signals to increase said credit; second personally operable means actuating means applying received debit-cancelling signals to said restoring means and also deactuating said control means; credit means operable by applied credit signals to increase said credit; means operating with said control means to connect received credit signals to said credit means when said reproducer means is operative; and means operable by received program termination signals to cause said control means to render said reproducer means inoperative.

29. Receiving apparatus as defined in claim 28 and comprising also means controlled by said personally operable means and operating to connect a predetermined load to a measuring circuit.

30. Receiving apparatus as defined in claim 28 and comprising also means controlled by said personally operable means and operating to connect to a measuring circuit a load device drawing a constant current over a wide range of applied voltage.

31. Receiving apparatus as defined in claim 28 and comprising also signal means operable by a further applied signal.

32. Receiving apparatus for a subscription program system in which program signals, debit signals, debit-cancelling signals, credit signals and program termination signals are transmitted, comprising in combination: credit register means to establish a variable credit; debit means operable by applied debit signals characterizing the price of a proffered program to reduce said credit by the amount of said price; program reproducer means; control means rendering said reproducer means selectively inoperative or operative to reproduce a program represented by said program signals; personally operable means operating to apply said debit signals to said debit means and operating also to cause said control means to render said reproducer means operative; means operated by said credit register means when the value of said credit becomes zero to prevent repeated effective operation of said personally operable means; credit means operable by applied credit signals to increase said credit; means operating with said control means to connect received credit signals to said credit means when said reproducer means is operative; and means operable by received program termination signals to cause said control means to render said reproducer means inoperative.

33. Receiving apparatus as defined in claim 32 and comprising also means controlled by said personally operable means and operating to connect to a measuring circuit a load device drawing a constant current over a wide range of applied voltage.

34. Aeceiving apparatus as defined in claim 32 and comprising also signal means operable by a further applied signal.

35. Receiving apparatus for a direct-current circuit subscription program system in which program signals, debit signals, debit-cancelling signals, credit signals and program termination signals are transmitted as alternating current signals and in which measurement signals and further signals are transmitted as direct-current signals, comprising in combination: credit register means to establish a variable credit; charge means operated by a received debit signal characterizing the price of a proffered program to reduce the amount of said credit by the amount of said price; program reproducer means; control means rendering said reproducer means selectively operative or inoperative; means operated by said credit register means when said credit becomes zero causing said control means to render said reproducer means inoperative; personally operable means causing said control means to render said reproducer means inoperable; restoring means operable by applied debit-cancelling signals to increase said credit;

means operating with said control means to connect received debit-cancelling signals to said restoring means when said reproducer means is inoperative; credit means operable by applied credit signals to increase said credit; means operating with said control means to connect received credit signals to said credit means when said reproducer means is operative; means operable by received program termination signals to cause said control means to render said reproducer means inoperative, means controlled by said personally operable means and operating to connect to said circuit a load device having a high impedance to alternating currents and having a constant resistance to direct currents over a wide range of direct voltages.

36. Receiving apparatus as defined in claim 35 and comprising also the combination of a series-connected capacitor and resistor, and a gas discharge tube shunting said capacitor, said combination being connected in shunt with said circuit.

37. Receiving apparatus for a subscription programme system, in which program signals, debit signals, debit-cancelling signals, credit signals and program termination signals are transmitted, comprising in combination: means to establish a credit; means displaying the value of said credit; charge means operable by a received debit signal of duration characterizing the price of a proffered program represented by said program signals to reduce said credit by an amount proportional to said duration; program reproducer means; personally operable means selectively operable to accept said program by applying said program signals to said reproducer means or to reject said program; means operating on reduction of said credit to a value not exceeding zero by said charge signal to permit acceptance of said proffered program; means operating on receipt of a charge signal when said credit has a value less than zero to prevent acceptance of said program; restoring means operable by a received debit-cancelling signal to increase said credit; means operable on rejection of said program to connect said debit-cancelling signal to said restoring means; credit means operable by applied credit signals to increase said credit; means operating with said control means to connect received credit signals to said credit means when said reproducer means is operative; and means operable by received program termination signals to cause said control means to render said reproducer means inoperative.

38. Receiving apparatus as defined in claim 37 and comprising also means conditioned by operation of said first personally operable means for operation by applied debit-cancelling signals to connect a predetermined load to a measurement circuit.

39. Receiving apparatus as defined in claim 37 and including signal means operable by a further received signal.

40. A subscription program distribution system comprising in combination: a communication network; a transmitting apparatus with a plurality of receiving apparatuses; said transmitting apparatus comprising a plurality of subscribers' positions, said apparatus including means for transmitting simultaneously to said positions: program signals representing a proffered program; debit signals characterizing the price of said program; credit signals and program terminating signals and said receiving apparatus comprising: credit register means to establish a variable credit; charge means operated by a received debit signal characterizing the price of a proffered program to reduce the amount of said credit by the amount of said price; program reproducer means; control means rendering said reproducer means selectively operative or inoperative; means operated by said credit register means when said credit becomes zero causing said control means to render said reproducer means inoperative; personally operable means causing said control means to render said reproducer means inoperative; restoring means operable by applied debit-cancelling signals to increase said credit; means operating with said control means to connect received debit-cancelling signals to said restoring means when said reproducer means is inoperative; credit means operable by applied credit signals to increase said credit; means operating with said control means to connect received credit signals to said credit means when said reproducer means is operative; and means operable by received program termination signals to cause said control means to render said reproducer means inoperative.

41. A subscription program distribution system comprising in combination: a wire communication network providing direct-current connexions between a transmitting apparatus and a plurality of receiving stations; said transmitting apparatus comprising means for transmitting first program signals as modulations of a first carrier wave within a first predetermined frequency range, means for transmitting control signals, comprising debit signals, debit-cancelling signals, credit signals and program termination signals, as modulations of a second carrier wave within a second frequency range, means for transmitting second program signals having frequencies within a third frequency range and means for transmitting measuring signals within a range of frequencies including zero frequency, and said receiving apparatus comprises in combination: credit register means to establish a variable credit; charge means operated by a received debit signal characterizing the price of a proffered program to reduce the amount of said credit by the amount of said price; program reproducer means; control means rendering said reproducer means selectively operative or inoperative; means operated by said credit register means when said credit becomes zero causing said control means to render said reproducer means inoperative; personally operable means causing said control means to render said reproducer means inoperative; restoring means operable by applied debit-cancelling signals to increase said credit; means operating with said control means to connect received debit-cancelling signals to said restoring means when said reproducer means is inoperative; credit means operable by applied credit signals to increase said credit; means operating with said control means to connect received credit signals to said credit means when said reproducer means is operative; means operable by received program termination signals to cause said control means to render said reproducer means inoperative; means controlled by said personally operable means and operating to connect to said circuit a load device having a high impedance to alternating currents and having a constant resistance to direct currents over a wide range of direct voltages.

References Cited

UNITED STATES PATENTS

| 3,119,558 | 1/1964 | Kinross | 178—5.1 |
| 3,249,689 | 5/1966 | Davis | 178—5.1 |
| 3,350,502 | 10/1967 | Russell | 178—5.1 |

RICHARD MURRAY, Primary Examiner

H. W. BRITTON, Assistant Examiner

U.S. Cl. X.R.

178—5.1; 325—308